Figure 1:
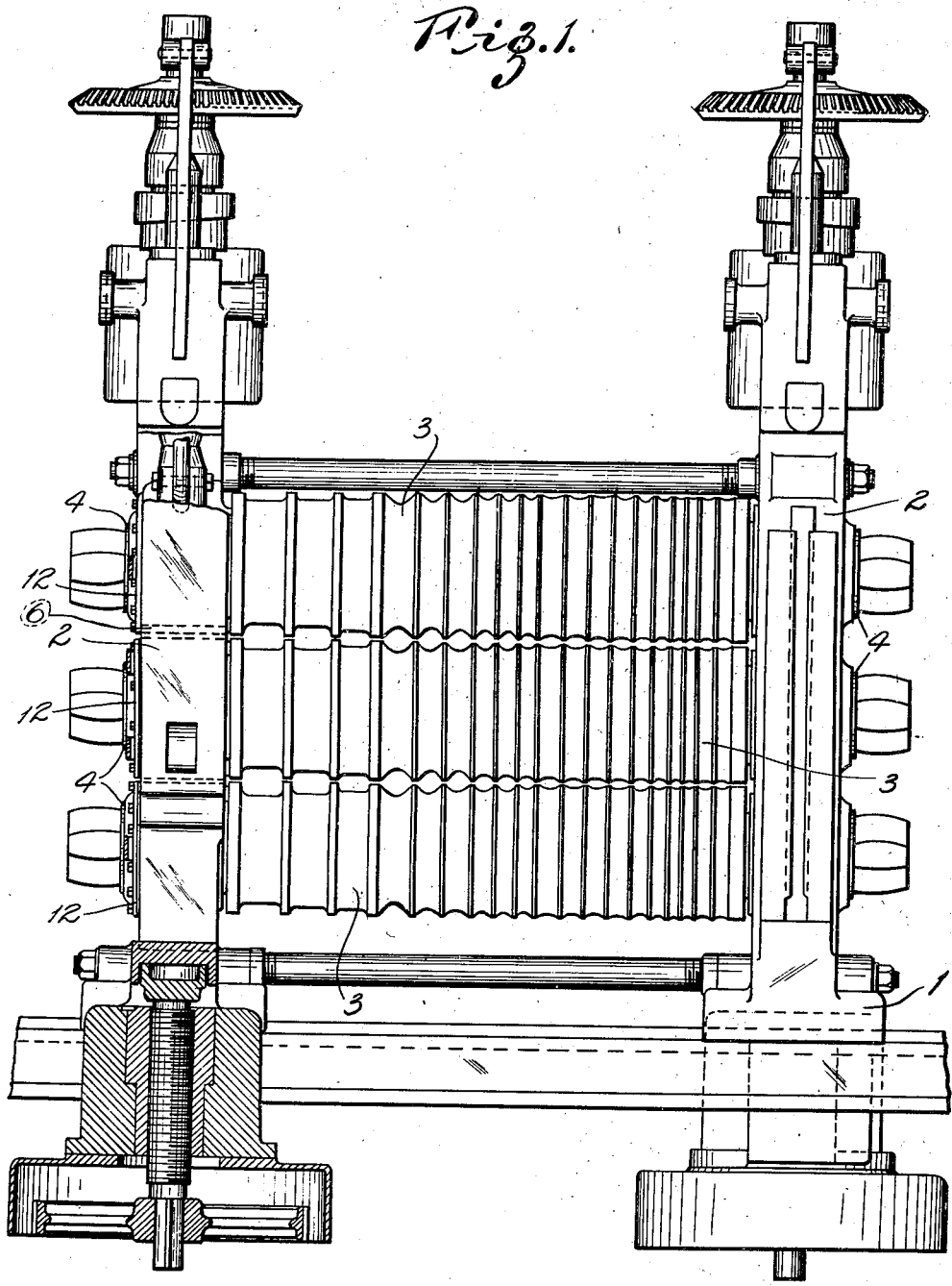

March 27, 1928.  1,664,157

T. V. BUCKWALTER

ROLLING MILL

Filed March 22, 1926  2 Sheets-Sheet 1

INVENTOR:
Tracy V. Buckwalter
HIS ATTORNEYS.

March 27, 1928.
T. V. BUCKWALTER
1,664,157
ROLLING MILL
Filed March 22, 1926    2 Sheets-Sheet 2
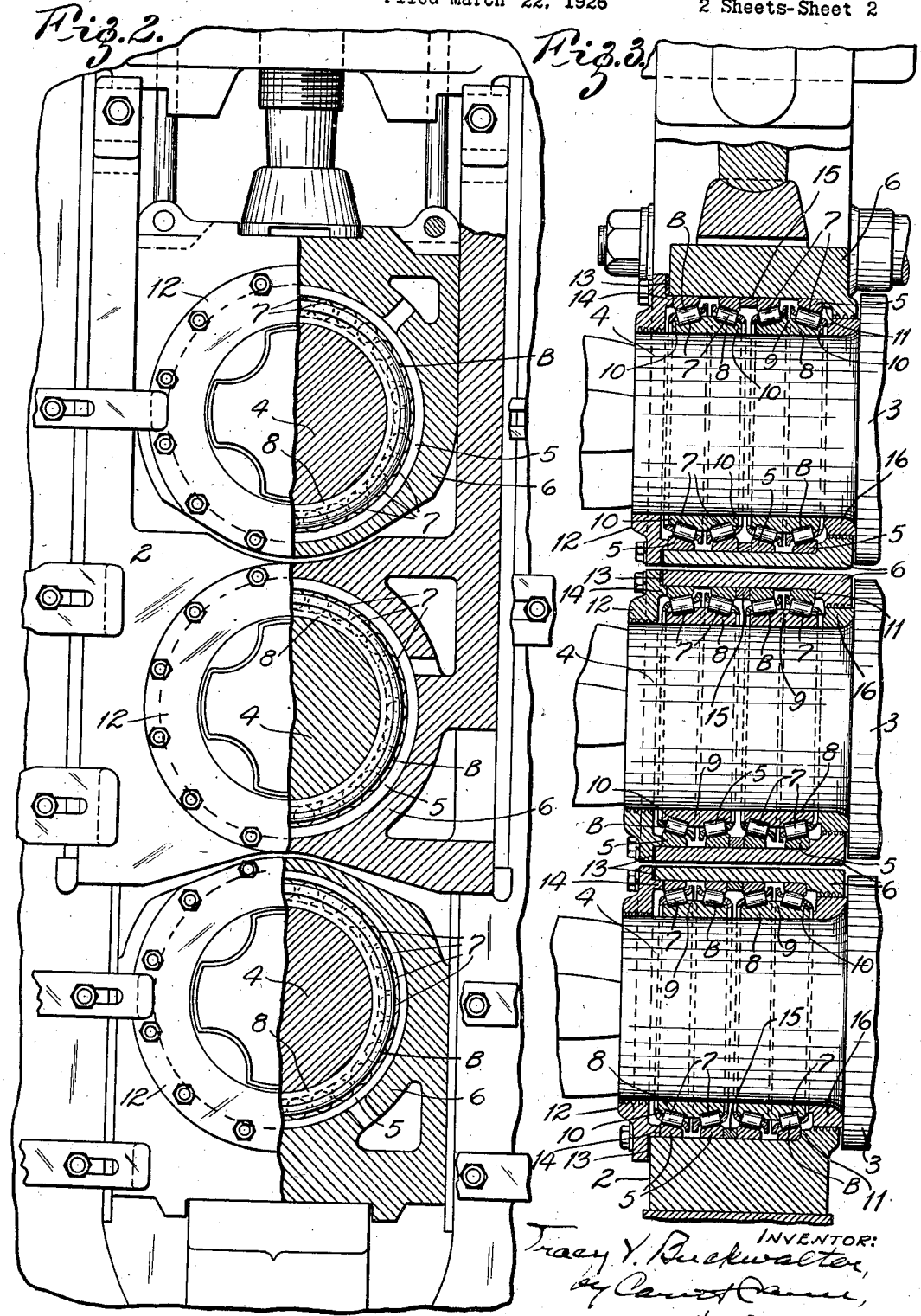
INVENTOR:
Tracy V. Buckwalter,
by  
HIS ATTORNEYS.

Patented Mar. 27, 1928.

1,664,157

UNITED STATES PATENT OFFICE.

TRACY V. BUCKWALTER, OF CANTON, OHIO, ASSIGNOR TO THE TIMKEN ROLLER BEARING COMPANY, OF CANTON, OHIO, A CORPORATION OF OHIO.

ROLLING MILL.

Application filed March 22, 1926. Serial No. 96,502.

My invention relates to rolling mills, particularly mills of the kind known as "three-high mills." The principal object of the invention is to provide for the use of roller bearings therein. The invention consists principally in interposing between the ends of each roll of the mill and the housings in which such rolls are mounted, a plurality of conical roller bearings. The invention also consists in the rolling mill and in the parts and combinations and arrangements of parts hereinafter described and claimed.

In the accompanying drawings, wherein like reference numerals indicate like parts wherever they occur, Fig. 1 is an elevation of a three-high rolling mill embodying my invention;

Fig. 2 is a view, partly an end elevation and partly a vertical section, illustrating the mounting of the rolls; and Fig. 3 is a detail vertical sectional view through the roller bearings and housings.

When a billet or the like passes through the rolling mill, the rolls thereof are subjected to high stresses that tend to spread them apart, and, accordingly, the necks of the rolls and the mounting devices therefor must be large and strong enough to take care of such stresses. It has been proposed to equip the rolls of a three-high rolling mill with ball bearings or cylindrical roller bearings; but in such case, the bearings of the middle roll have been offset longitudinally with relation to bearings of the top and bottom roll; which arrangement sacrifices the great advantage of vertical alinement of the bearings and ends of the rolls and has the great disadvantage of increasing the distance between the bearing at one end of the roll and the bearing at the other end thereof. The present invention provides for the equipment of all of the rolls of a rolling mill with conical roller bearings in such a way as to maintain the alinement of the bearings of the several rolls and preserve the usual distance between the bearings at the ends of each roll.

The mill comprises a base 1, and frames 2 and rolls 3 of common type; but instead of the usual journal bearings and their housings, the necks 4 of the rolls are provided with roller bearings B whose cups 5 are contained in housings 6 removably and adjustably mounted in the end frames 2.

In order to keep the overall diameter of the bearings B within the limits practicably available therefor and still enable such bearings to withstand the radial and endwise stresses to which they are subject, taper rollers 7 are used, said rollers being arranged in a multiplicity of circular series. In the construction illustrated, there are four such series of conical rollers 7. The four series are arranged in two groups of two series each, each group being provided with a common cone 8 or inner bearing member. Each of said cones 8 is provided with two outwardly tapering conical raceways and with a central annular thrust rib 9 for the large ends of the taper rollers and preferably with thrust ribs 10 at the smaller end of each raceway. The cups 5 or outer bearing members for the taper rollers are mounted in the several housings 5. The innermost cup 5 of each series is seated against a shoulder 11 in the end of each housing 6, and the outermost cup 5 is mounted in the end of each housing 6.

An end-closure ring 12 secured to the outer end of each housing and spaced away therefrom by means of shims 13, is provided with an annular rib 14 that abuts against the outermost cup 5 of each series of bearings B. Preferably a ring 15 is disposed in each housing, filling the space between the middle bearing cups 5, although said cups might be made integral, if desired. Thus, by means of the end closure rings, all of the bearings may be adjusted, the adjustment passing from one portion of the bearing to the next and being transmitted throughout the entire series. Preferably an annular washer 16 is mounted on each roll adjacent to the innermost bearing cone.

By using a multiplicity of taper rollers on each roll of the rolling mill, it is possible for the roller bearings to accommodate the radial and thrust stresses to which they are subjected, and this capability of the roller bearings is provided without sacrificing the strength of the necks of the rolls and their housings and without increasing the span between the bearings of any roll. The above described taper roller bearings may be applied to the rolls of old mills.

In addition to the foregoing advantages, the above described construction minimizes friction and prolongs the life of the rolls and housing members and makes it possible to obtain better adjustment and more accurate positioning of the rolls. Obviously numerous changes may be made without departing from the invention and I do not wish to be limited to the precise construction shown.

What I claim is:

1. A rolling mill comprising end frames, roll housings in said frames arranged in axial vertical alinement, rolls having their ends mounted in said housings and a multiplicity of series of conical roller bearings interposed between each end of each roll and its housing, and each bearing comprising a bearing cup mounted in the housing.

2. A rolling mill comprising end frames, roll housings in said frames in central vertical alinement, rolls having their necks mounted in said housings and a multiplicity of series of conical roller bearings interposed between each neck of each roll and its housing, said bearings being arranged in two groups of two series each and each group having a common inner bearing member.

3. A rolling mill comprising end frames, vertically alined roll housings in said frames, rolls having their ends mounted in said housings, and a multiplicity of series of conical roller bearings interposed between each end of each roll and its housing, and means for adjusting all of said roller bearings from the outermost bearing.

4. A rolling mill comprising rolls, housings for the ends of said rolls, and a plurality of conical roller bearings interposed between each end of each roll and the adjacent housing, each bearing comprising an inner bearing member with reversely conical bearing surfaces, an annular series of conical rollers on each of said conical bearing surfaces and a separate bearing cup mounted in said housing for each annular series of rollers, the bearing portions of the ends of all the rolls being equidistant from the median line of said mill.

5. A rolling mill comprising rolls of substantially even length and with short necks, roll housings substantially equidistant from the median line of the mill, and a multiplicity of series of conical roller bearings interposed between each neck of each roll and its housing and each bearing comprising a reversely tapered cone mounted on such neck and providing two raceways, an annular series of conical rollers for each raceway and a separate bearing cup mounted in said housing for each series of rollers.

Signed at Canton, Ohio, this 15th day of March, 1927.

TRACY V. BUCKWALTER.